US012731750B2

(12) United States Patent
Xing et al.

(10) Patent No.: US 12,731,750 B2
(45) Date of Patent: Sep. 8, 2026

(54) OPERATING MECHANISM

(71) Applicant: Chint Low Voltage Electrical Technology Co., Ltd., Shanghai (CN)

(72) Inventors: Leilei Xing, Shanghai (CN); Zhibin Qin, Shanghai (CN); Dasheng Xu, Shanghai (CN); Jiangtao Wang, Shanghai (CN)

(73) Assignee: Chint Low Voltage Electrical Technology Co., Ltd. (CN)

( * ) Notice: Subject to any disclaimer, the term of this patent is extended or adjusted under 35 U.S.C. 154(b) by 0 days.

(21) Appl. No.: 18/992,970

(22) PCT Filed: Nov. 29, 2023

(86) PCT No.: PCT/CN2023/135066

§ 371 (c)(1),
(2) Date: Jan. 9, 2025

(87) PCT Pub. No.: WO2024/114683

PCT Pub. Date: Jun. 6, 2024

(65) Prior Publication Data

US 2026/0018360 A1 Jan. 15, 2026

(30) Foreign Application Priority Data

Dec. 1, 2022 (CN) ......................... 202223216846.8
Sep. 6, 2023 (CN) ......................... 202322416166.9

(51) Int. Cl.
*H01H 71/50* (2006.01)

(52) U.S. Cl.
CPC ................................. *H01H 71/504* (2013.01)

(58) Field of Classification Search
CPC .................................................... H01H 71/504
See application file for complete search history.

(56) References Cited

FOREIGN PATENT DOCUMENTS

CN 205920942 U * 2/2017 ........... H01H 71/504
CN 107481897 A * 12/2017 ............. H01H 71/10
(Continued)

OTHER PUBLICATIONS

USPTO Machine Translation (retrieved from FIT database) of the Description of CN 215731545 U, Liu et al., Feb. 1, 2022. (Year: 2025).*
(Continued)

*Primary Examiner* — Daniel D Yabut
(74) *Attorney, Agent, or Firm* — OSTROLENK FABER LLP

(57) ABSTRACT

An operating mechanism includes a main shaft rotatably mounted on a side plate, and a swinging member arranged on the main shaft. The side plate has a limiting shaft blocking the rotation of the swinging member. A rotatable blocking member and an elastic member connected to the blocking member are on the swinging member. The swinging member drives the blocking member around the main shaft. The elastic member drives a blocking portion of the blocking member to rotate toward the main shaft to locate the limiting shaft outside a path of the blocking portion. An impacting member is inside the main shaft on the side plate and has two limiting portions arranged at intervals and in limiting fit with the main shaft. The impacting member pushes the blocking portion to rotate away from the main shaft to locate the limiting shaft on the path of the blocking portion.

14 Claims, 12 Drawing Sheets

(56) References Cited

FOREIGN PATENT DOCUMENTS

| | | | | | |
|---|---|---|---|---|---|
| CN | 109659205 | A | | 4/2019 | |
| CN | 215731545 | U | | 2/2022 | |
| CN | 217655835 | U | | 10/2022 | |
| CN | 219534441 | U | | 8/2023 | |
| JP | 2001093388 | A | | 4/2001 | |
| WO | WO-2019227653 | A1 | * | 12/2019 | ........... H01H 71/121 |

OTHER PUBLICATIONS

USPTO Machine Translation (retrieved from FIT database) of the Description of CN 217655835 U, Xu et al., Oct. 25, 2022. (Year: 2025).*

International Search Report mailed Feb. 8, 2024 in corresponding PCT International Application No. PCT/CN2023/135066.

* cited by examiner

OPERATING MECHANISM

CROSS-REFERENCE TO RELATED APPLICATIONS

The present application is a 35 U.S.C. §§ 371 national stage application of International Application No. PCT/CN2023/135066, filed Nov. 29, 2023, which claims priority to Chinese Patent Application Nos. 202223216846.8, filed Dec. 1, 2022, and 202322416166.9, filed Sep. 6, 2022, the contents of which are incorporated by reference.

TECHNICAL FIELD

The present invention relates to the field of low-voltage electrical appliances, in particular to an operating mechanism.

BACKGROUND

In an operating mechanism of the existing universal circuit breaker (a frame type), a main shaft of the operating mechanism will have a rebound problem from a closed state to an opened state. After the main shaft rebounds, both an arc re-ignition phenomenon of a high-voltage circuit breaker and a continuous arcing phenomenon on a DC circuit breaker can be caused, even resulting in the explosion of the circuit breaker. Therefore, it is necessary to prevent main shafts of the DC circuit breaker and the high-voltage circuit breaker from rebounding.

SUMMARY

An object of the present invention is to overcome the defects of the prior art and provide an operating mechanism that can prevent a main shaft from rebounding.

In order to achieve the above object, the present invention adopts the following technical solutions:

An operating mechanism, comprising a main shaft rotatably mounted on a side plate, and a swinging member arranged on the main shaft, the side plate being provided with a limiting shaft for blocking the rotation of the swinging member; a rotatable blocking member and an elastic member connected to the blocking member are arranged on the swinging member; the swinging member can drive the blocking member to rotate around the main shaft; the elastic member is used for driving a blocking portion of the blocking member to rotate toward the main shaft, so that the limiting shaft is located outside a path of the blocking portion which rotates around the main shaft; the operating mechanism is also provided with an impacting portion; the impacting portion is provided with two limiting portions arranged at intervals; the two limiting portions are respectively in limiting fit with the main shaft; and when the blocking member rotates along with the swinging member and contacts the impacting member, the impacting member is used for pushing the blocking portion to overcome an acting force of the elastic member to rotate away from the main shaft, so that the limiting shaft is located on the path of the blocking portion which rotates around the main shaft as the center.

Preferably, when the swinging member rotates to an opening position, the swinging member contacts the limiting shaft; and when the swinging member rotates from a closing position to the opening position, the blocking member contacts the impacting member.

Preferably, the blocking member comprises a pivoting portion that is rotatably connected to the swinging member, and a blocking portion connected to the pivoting portion; a blocking surface is arranged at one end of the blocking portion away from the pivoting portion; when the swinging member rotates to the closing position, the blocking surface and the impacting member are oppositely located on both sides of a line connecting the main shaft and the limiting shaft; when the swinging member rotates to the opening position, the blocking member is driven to rotate and contact the impacting member, and the blocking surface rotates to align on the same side as the impacting member with the line connecting the main shaft and the limiting shaft; and the blocking surface is designed to cooperate with the limiting shaft to block the swinging member from rotating back towards the closing position.

Preferably, the pivoting portion is spaced apart from the main shaft to form a first avoidance groove; the first avoidance groove is used for avoiding the impacting member; an impacting portion is arranged on one side of the blocking portion close to the main shaft; the impacting member first passes through the first avoidance groove and then pushes the impacting portion, so that the impacting portion drives the blocking portion to rotate away from the main shaft.

Preferably, the impacting member is provided with a second avoidance groove for avoiding the pivoting portion.

Preferably, the main shaft is rotatably mounted on a bearing bush; the bearing bush is connected to the side plate through a connecting member; the impacting member is provided with a connecting hole designed to cooperate with the connecting member; and the impacting member, the bearing bush and the side plate are fixed through the connecting member.

Preferably, a shaft sleeve is arranged between the impacting member and the bearing bush; the shaft sleeve is sleeved on the connecting member; and the shaft sleeve is used for limiting the impacting member, so that the impacting member and the blocking member are located on the same plane.

Preferably, a sliding surface of an arc shape is arranged between the two limiting portions, and the sliding surface is in sliding fit with the main shaft.

Preferably, the impacting member and the blocking member are respectively arranged in two different planes, a side surface of at least one of the impacting member and the blocking member is provided with a protruding impacting shaft, and the impacting shaft extends into the plane where the other one is located for contact limiting.

Preferably, the impacting shaft is arranged on a side surface of the blocking member, the impacting shaft extends into the plane where the impacting member is located, and the impacting member is in contact limiting with the impacting shaft; or, the impacting shaft is arranged on a side surface of the impacting member, the impacting shaft extends into the plane where the blocking member is located, and the blocking member is in contact limiting with the impacting shaft.

Preferably, the impacting member is fixedly connected to the bearing bush through the connecting member; the length of the connecting member is greater than a sum of the thickness of the swinging member and the thickness of the blocking member; and the swinging member and the blocking member can be inserted between the impacting member and the bearing bush, respectively.

Preferably, the impacting member is pentagonal; the impacting member includes a first side edge, a second side edge, a third side edge, a fourth side edge and a fifth side edge that are connected in sequence; the first side edge is provided with a positioning groove; the second side edge is in contact fit with the impacting shaft; the third side edge is respectively arranged at an oblique angle to the second side edge and the fourth side edge; and one side of the junction between the fourth side edge and the fifth side edge close to the middle part of the impacting member is connected to the connecting member.

Preferably, the impacting shaft is arranged on a side surface of the blocking member away from the swinging member; the side surface of the blocking member close to the swinging member is provided with a swinging shaft designed to cooperate with the elastic member; the elastic member pushes the swinging shaft to drive the blocking member to rotate; the swinging member is provided with an avoidance hole for avoiding the swinging shaft; and the swinging shaft is coaxially arranged with the impacting shaft.

Preferably, the swinging member is provided with a blocking shaft; the blocking member is provided with a mounting hole for being sleeved on the blocking shaft; the elastic member comprises a spiral portion arranged between the blocking member and the swinging member, and two elastic rods respectively connected to the spiral portion; the spiral portion is rotatably mounted on the blocking shaft; and the two elastic rods are designed to cooperate with the main shaft and the swinging shaft, respectively.

Preferably, two opposite side edges of the blocking member are respectively provided with an avoidance surface and an impacting portion, respectively; two opposite side edges of the impacting portion are respectively provided with a swinging shaft and an impacting shaft, respectively; and the avoidance surface is used for avoiding the limiting shaft when the anti-rebound structure is in contact limiting with the limiting structure.

The operating mechanism of the present invention pushes a blocking member to rotate through an impacting member, instead of a blocking member in the prior art that rotates by means of its own inertia, such that a blocking portion of the blocking member rotates away from a main shaft more quickly, thereby ensuring that the limiting shaft is located on a path of the blocking portion which rotates around the main shaft, and then preventing the rebound of a swinging member and preventing the rebound of the swinging member before the blocking member is released from the limiting shaft, and avoiding the problem of poor reliability of the blocking member that rotates by means of its own inertia. Finally, the blocking portion is driven by an elastic member to be in contact with the blocking member again, so that the swinging member can return to an original position under normal circumstances, and a limiting portion on the impacting member can play the role of fixing the impacting member. The blocking member exerts an acting force to the main shaft, so as to avoid the damages of the impacting member after multiple impacts, thereby effectively prolonging the service life of the impacting member.

In addition, an operating mechanism in Embodiment 2, by arranging an impacting member and a blocking member in two different planes respectively, can ensure that the impacting member and the blocking member are not arranged in the same plane. The impacting member does not need to extend between the blocking member and the main shaft and is in limiting contact with the blocking member, thereby effectively utilizing a space on the side surface of the blocking member, and increasing the volume of the impacting member. Therefore, the difficulty of assembly can be reduced, and the impacting member can select a more reasonable shape and a larger volume, so the area of contact between the impacting member and the blocking member can be increased, or the strength of the impacting member is improved, such that the impacting member is designed to cooperate with the blocking member more reliably.

In addition, the impacting member is provided with a positioning groove. A positioning surface of an arc shape is arranged in the positioning groove. The positioning groove is used for being sleeved on the main shaft, such that the positioning surface is in contact limiting with the side surface of the main shaft. The limiting fit between the main shaft and the impacting member can play the role of positioning and supporting the impacting member, thereby preventing the position of the impacting member from changing in the follow-up work.

DETAILED DESCRIPTION OF THE INVENTION

The specific implementation of an operating mechanism of the present invention will be further described below with reference to the embodiments given in accompanying diagrams. The operating mechanism of the present invention is not limited to the description of the following embodiments.

Embodiment 1

Figure 1:
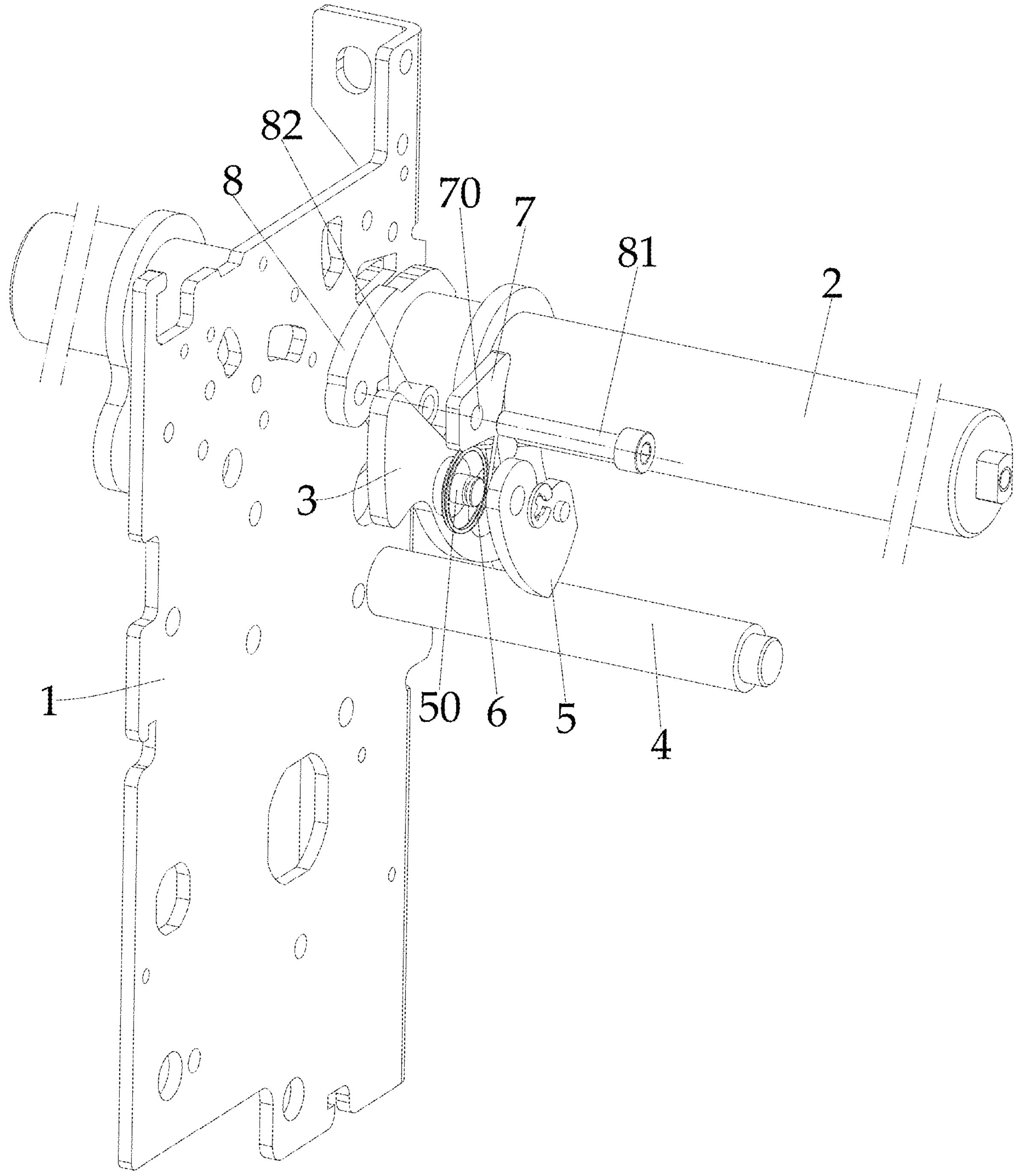
FIG. 1 is an exploded view of an operating mechanism in Embodiment 1.

As shown in FIG. 1, an operating mechanism of the present invention includes a main shaft 2 rotatably mounted on a side plate 1, and a swinging member 3 arranged on the main shaft 2. The side plate 1 is provided with a limiting shaft 4 for blocking the rotation of the swinging member 3. The swinging member 3 can drive the blocking member 5 to rotate around the main shaft 2. An elastic member 6 is used for driving a blocking portion 51 of the blocking member 5 to rotate toward the main shaft 2, so that the limiting shaft 4 is located outside a path of the blocking member 51 which rotates around the main shaft 2. An impacting member 7 is arranged inside the main shaft 2 on the side plate 1. The impacting member 7 is used for pushing the blocking portion 51 to overcome an acting force of the elastic member 6 and rotate away from the main shaft 2, so that the limiting shaft 4 is located on the path of the blocking portion 51 which rotates around the main shaft 2.

The operating mechanism of the present invention pushes the blocking member 5 to rotate through the impacting member 7, instead of a blocking member 5 in the prior art that rotates by means of its own inertia, such that the blocking portion 51 of the blocking member 5 rotates away from the main shaft 2 more quickly, thereby ensuring that the limiting shaft 4 is located on the path of the blocking portion 51 which rotates around the main shaft 2, and then preventing the rebound of the swinging member 3 and preventing the rebound of the swinging member 3 before the blocking member 5 is released from the limiting shaft 4, and avoiding the problem of poor reliability of the blocking member 5 that rotates by means of its own inertia. Finally, the blocking portion 51 is driven by the elastic member 6 to be in contact with the blocking member 5 again, so that the swinging member 3 can return to an original position under normal circumstances.

As shown in FIG. 1, the main shaft 2 can rotate to a closing position and an opening position, so as to drive a moving contact of a circuit breaker to swing, thereby realizing opening and closing operations. At least one swinging member 3 is fixedly arranged on the main shaft 2. The swinging member 3 can be fastened on the main shaft 2 by means of welding and swing along with the main shaft 2. The swinging member 3 is used for being connected to the moving contact, or for being connected to a link mechanism (not shown), or for being connected to other mechanisms that are driven by the main shaft 2. The operating mechanism further includes a main spring, an energy storage mechanism (not shown) and a link mechanism (not shown). The link mechanism is connected to the main shaft 2. A user makes the energy storage mechanism store energy through a handle or an electric operation mechanism. When the energy storage mechanism releases energy, the link mechanism is driven to drive the main shaft 2 to rotate to the closing position. When the circuit breaker is opened, a tripping half-shaft is triggered to be unlocked from the link mechanism. The main spring drives the link mechanism to drive the main shaft 2 to reversely rotate to the opening position. This is the prior art in the art, and will not be further elaborated on.

As shown in FIG. 1, the impacting member 7 is arranged inside the main shaft 2 on the side plate 1. In the present embodiment, the main shaft 2 is rotatably mounted on a bearing bush 8. The bearing bush 8 is connected to the side plate 1 through a connecting member 81. The impacting member 7 is provided with a connecting hole 70 designed to cooperate with the connecting member 81. The connecting member 81 passes through a connecting plate, the bearing bush 8 and the side plate 1 respectively. The impacting member 7, the bearing bush 8 and the side plate 1 are fixed together through the connecting member 81. The impacting member 7 is fixed through the existing connecting member 81 on the bearing bush 8, without additionally arranging parts for connecting the impacting member 7, achieving the characteristics of small number of parts, compact structure and convenient assembly. Of course, additional parts can also be arranged, in place of the connecting member 81, to connect the impacting member 7 with the bearing bush 8 or the side plate 1, all of which falls within the protection scope of the present invention.

Further, a shaft sleeve 82 is arranged between the impacting member 7 and the bearing bush 8. The shaft sleeve 82 is sleeved on the connecting member 81. The shaft sleeve 82 is used for limiting the impacting member 7 to offset the thickness of the swinging member 3, so that the impacting member 7 and the blocking member 5 are located in the same plane.

Figure 2:
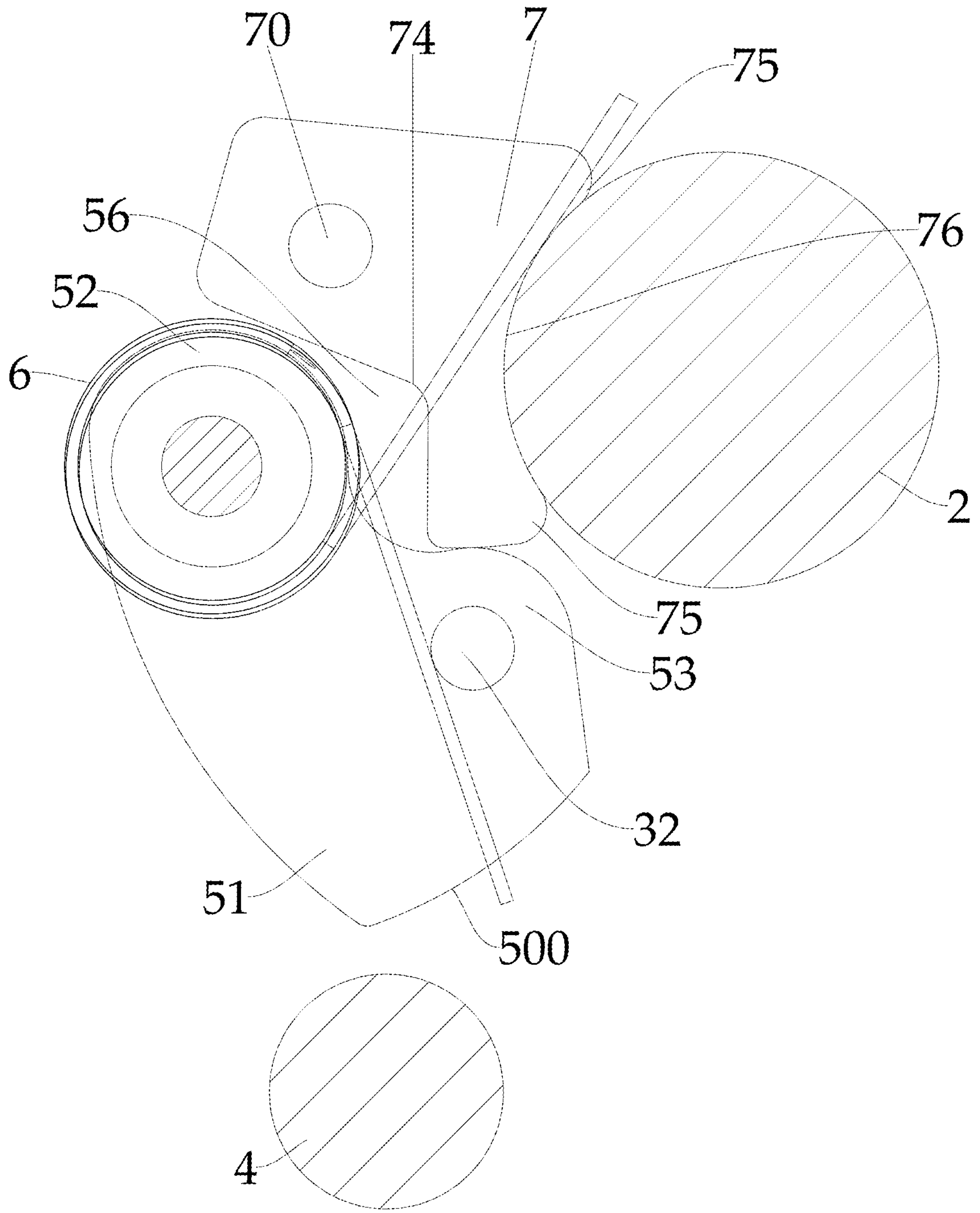
FIG. 2 is a sectional view of the operating mechanism in Embodiment 1.

As shown in FIGS. 1-2, the impacting member 7 is provided with two limiting portions 75 arranged at intervals. The two limiting portions 75 are in limiting fit with the main shaft 2, respectively. The limiting portions 75 can play the role of fixing the impacting member 7, and the impacting member 7 can exert an acting force on the blocking member 5 and transmit the acting force to the main shaft 2, thereby avoiding the impacting member 7 from being damaged after multiple impacts, and effectively prolonging the service life of the impacting member 7.

Further, a sliding surface 76 of an arc shape is arranged between the two limiting portions 75. The sliding surface 76 is in sliding fit with the main shaft 2. The sliding surface 76 can increase a contact area between the impacting member 7 and the main shaft 2, and further improve the reliability of the impacting member 7.

As shown in FIGS. 2, 4-6, when the swinging member 3 rotates to an opening position, the swinging member 3 is in contact with the limiting shaft 4. The limiting shaft 4 limits the swinging member 3 at the opening position. The swinging member 3 rotates from the closing position to the opening position, and drives the blocking member 5 to be in contact with the impacting member 7. Specifically, when the swinging member 3 is about to rotate to the opening position, that is, at an instant before the swinging member 3 will collide with the limiting shaft 4 and rebound, the blocking member 5 rotates along with the swinging member 3 and is in contact with the impacting member 7. The impacting member 7 pushes the blocking portion 51 to overcome an acting force of the elastic member 6 and rotates away from the main shaft 2, so that the limiting shaft 4 is located on the path of the blocking portion 51 which rotates around the main shaft 2. The limiting shaft 4 can limit the blocking portion 51 to prevent the swinging member 3 from rebounding.

Specifically, the blocking member 5 includes a pivoting portion 52 rotatably connected to the swinging member 3, and a blocking portion 51 connected to the pivoting portion 52. A blocking surface 500 is arranged at one end of the blocking portion 51 away from the pivoting portion 52. When the swinging member 3 rotates to the closing position (referring to FIG. 4), the blocking surface 500 and the impacting member 7 are oppositely located at both sides of a line connecting the main shaft 2 and the limiting shaft 4. When the swinging member 3 rotates to the opening position (referring to FIGS. 5 and 6), the blocking member 5 is driven to rotate and contact the impacting member 7, and the blocking surface 500 rotates to align on the same side as the impacting member 7 with the line connecting the main shaft 2 and the limiting shaft 4. The blocking surface 500 is designed to cooperate with the limiting shaft 4 to block the swinging member 3 from rotating back towards the closing position. At an instant when the swinging member 3 rotates to the opening position and collides with the limiting shaft 4, the impacting member 7 has pushed the blocking portion 51 to overcome the acting force of the elastic member 6 and rotate away from the main shaft 2. During impacting, the blocking member 5 also overcomes the effect of a torsion spring 6 due to inertia, such that the blocking member 51 deviates away from the main shaft 2. The swinging member 3 can rebound after colliding with one side of the limiting shaft 4. At this time, the blocking surface 500 will collide with the other side of the limiting shaft 4, thereby preventing the swinging member 3 from rebounding further.

Further, the pivoting portion 52 is spaced apart from the first shaft 2 to form a first avoidance groove 56. The first avoidance groove 56 is used for avoiding the impacting member 7. An impacting portion 53 is arranged on one side of the blocking portion 51 close to the main shaft 2. The impacting member 7 first passes through the first avoidance groove 56 and then pushes the impacting portion 53, so that the impacting portion 53 drives the blocking portion 51 to rotate away from the main shaft 2.

Further, the impacting member 7 is provided with a second avoidance groove 74 for avoiding the pivoting portion 52. The second avoidance groove 74 can avoid the impacting member 7 from contacting other parts of the blocking member 5.

Figure 3:
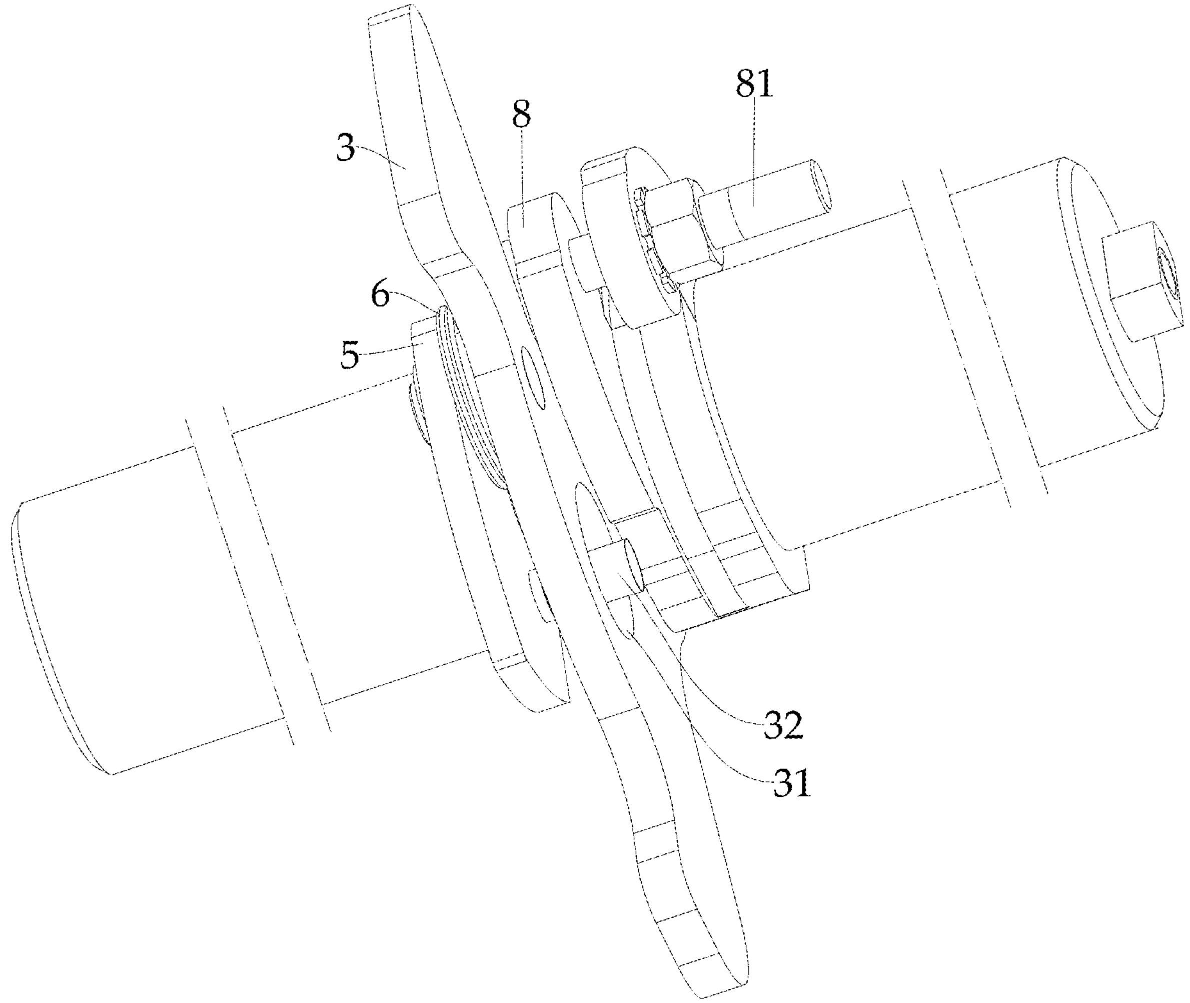
FIG. 3 is a schematic structural diagram of the operating mechanism in Embodiment 1.

As shown in FIG. 3, the blocking member 5 is provided with a blocking shaft 50 and a swinging shaft 32 connected to the elastic member 6. The swinging shaft 32 functions to hang the torsion spring so as to provide a torsion force of the torsion spring. The swinging member 3 is provided with a swinging hole 31 for limiting the swinging shaft 32, and meanwhile, the swinging hole 31 limits a movement range of the swinging shaft 32, thereby preventing the blocking member 5 from contacting the main shaft 2. The elastic member 6 is a torsion spring arranged between the blocking member 5 and the swinging member 3. The torsion spring is sleeved on the blocking shaft 50. Both ends of the torsion spring are connected to the swinging shaft 32 and the main shaft 2, respectively.

Further, both ends of the torsion spring that are respectively connected to the swinging shaft 32 and the main shaft 2 are intersected. The swinging shaft 32 is provided with a limiting groove. One end of the torsion spring is inserted into the limiting groove for limiting fit. Both ends of the torsion spring are intersected, such that a torsion force of the torsion spring can be increased. One end of the torsion spring exerts a force, facing the main shaft 2, to the blocking member 5 through the swinging shaft 32. Therefore, the blocking member 5 in a stable state (except for an instant of opening) can approach the main shaft 2 as much as possible. If both ends of the torsion spring that are respectively connected to the swinging shaft 32 and the main shaft 2 are not intersected, the torsion force of the torsion spring may not be enough to guarantee that the blocking member 5 obtains a sufficient restoring force. The blocking member 5 may begin to shift in the usual rotation process of the swinging member 3, and then the torsion spring fails. In addition, if the shape of the elastic member 6 changes, and a bending structure is arranged on the elastic member 6 to be connected with the blocking member 5, the swinging shaft 32 may also be changed such that the limiting hole is in limiting fit with the bending structure of the torsion spring, all of which falls within the protection scope of the present invention.

Figure 4:
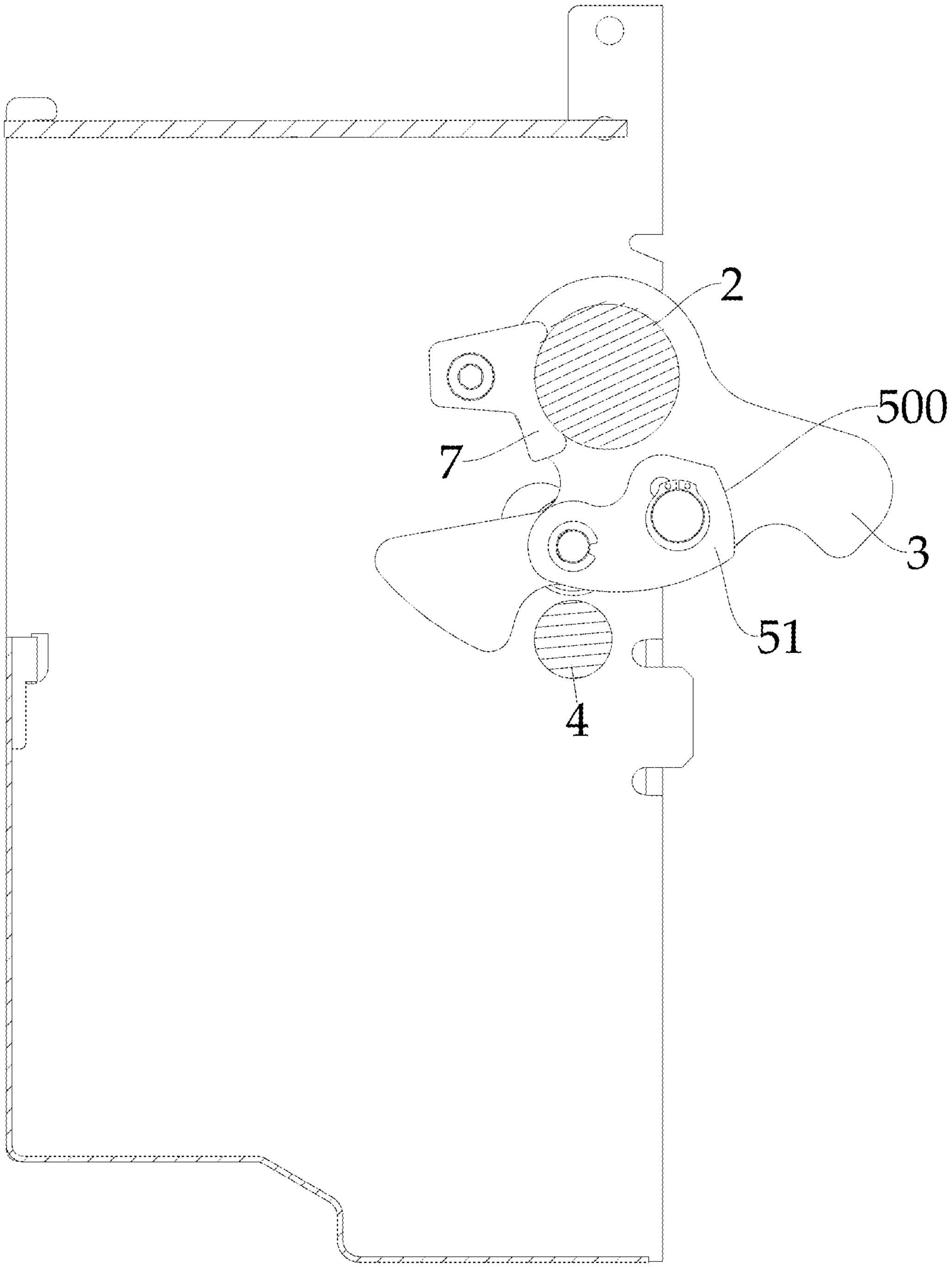
FIGS. 4-5 show a closing to opening process of the operating mechanism in Embodiment 1.

As shown in FIG. 4, at an initial stage of a closing to opening process of the operating mechanism, the swinging member 3 is located at the closing position. At this time, the limiting shaft 4 is located outside the path of the blocking portion 51 which rotates around the main shaft 2. The blocking surface 500 and the impacting member 7 are oppositely located on both sides of the limiting shaft 4. The swinging member 3 rotates clockwise to the opening position along with the main shaft 2. The blocking surface 500 may rotate to the left side of the limiting shaft 4 from above.

Figure 5:
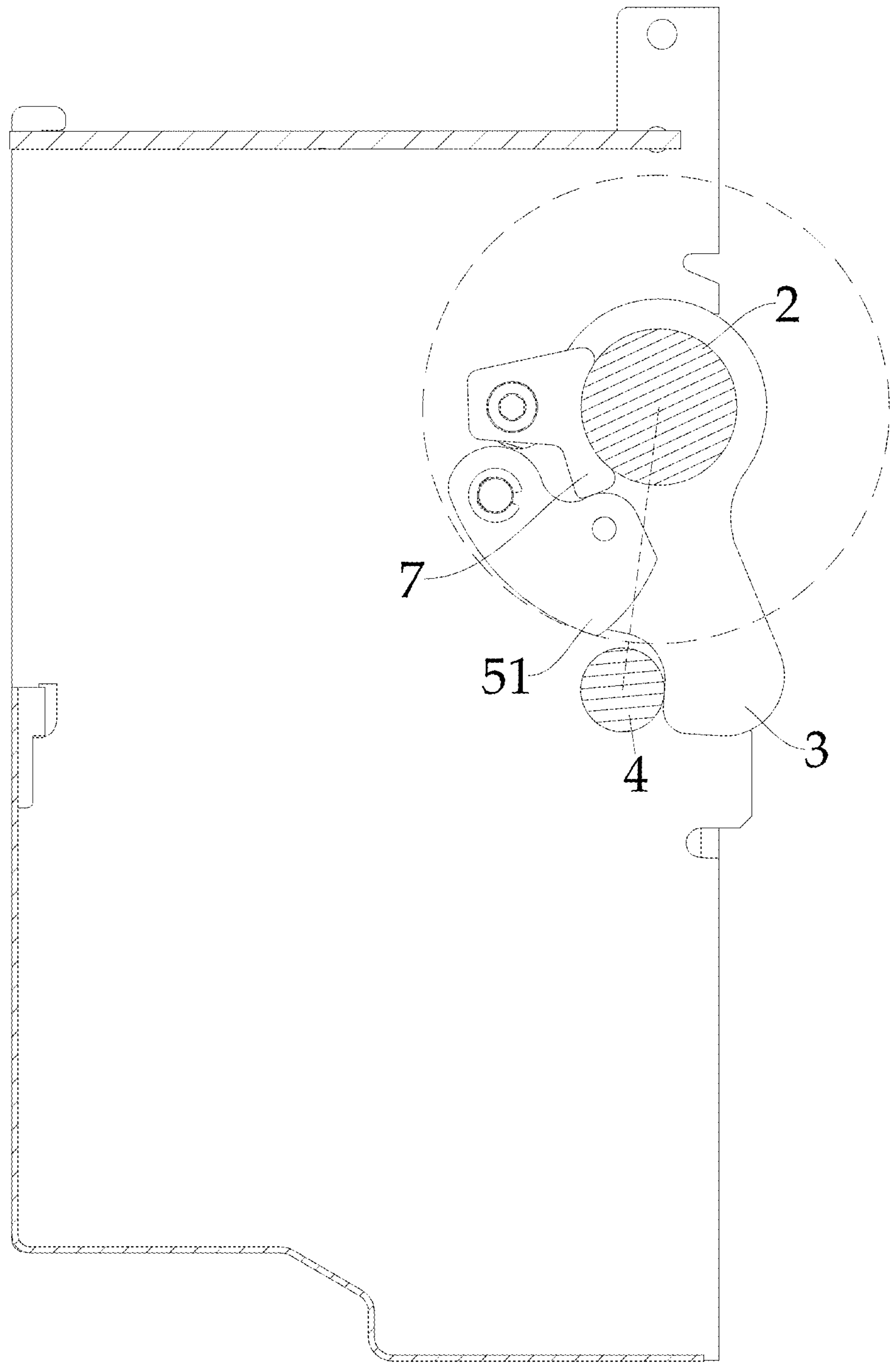
Figure 6:
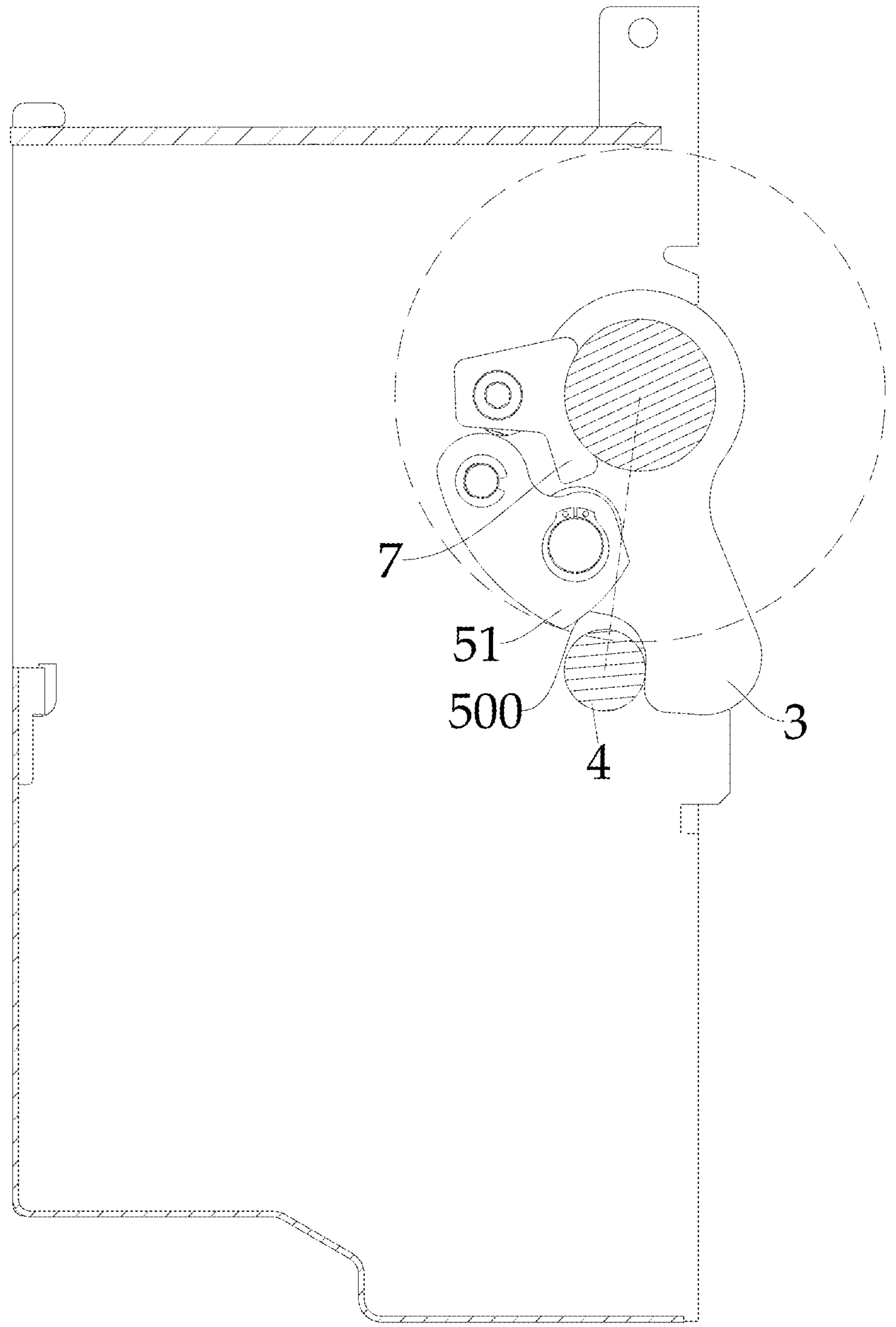
FIG. 6 shows a moment when an impacting member of the operating mechanism in Embodiment 1 pushes a blocking portion.

As shown in FIG. 5, at an end stage of the closing to opening process of the operating mechanism, i.e., an instant when the blocking portion 51 just contacts the impacting member 7, the blocking member 5 is limited by the impacting member 7, and the blocking member 51 is driven to rotate around the pivoting portion 52 relative to the swinging member 3. At the next moment, the blocking member 51 overcomes the acting force of the elastic member 6 and rotates away from the main shaft 2 to a position in FIG. 6, so that the limiting shaft 4 is located on the path of the blocking portion 51 which rotates around the main shaft 2. The swinging member 3 collides with the limiting shaft 4 and rebounds. At this time, the blocking portion 51 is blocked by the limiting shaft 4, and the swinging member 3 cannot rotate counterclockwise to the limiting shaft 4.

Embodiment 2

Figure 7:
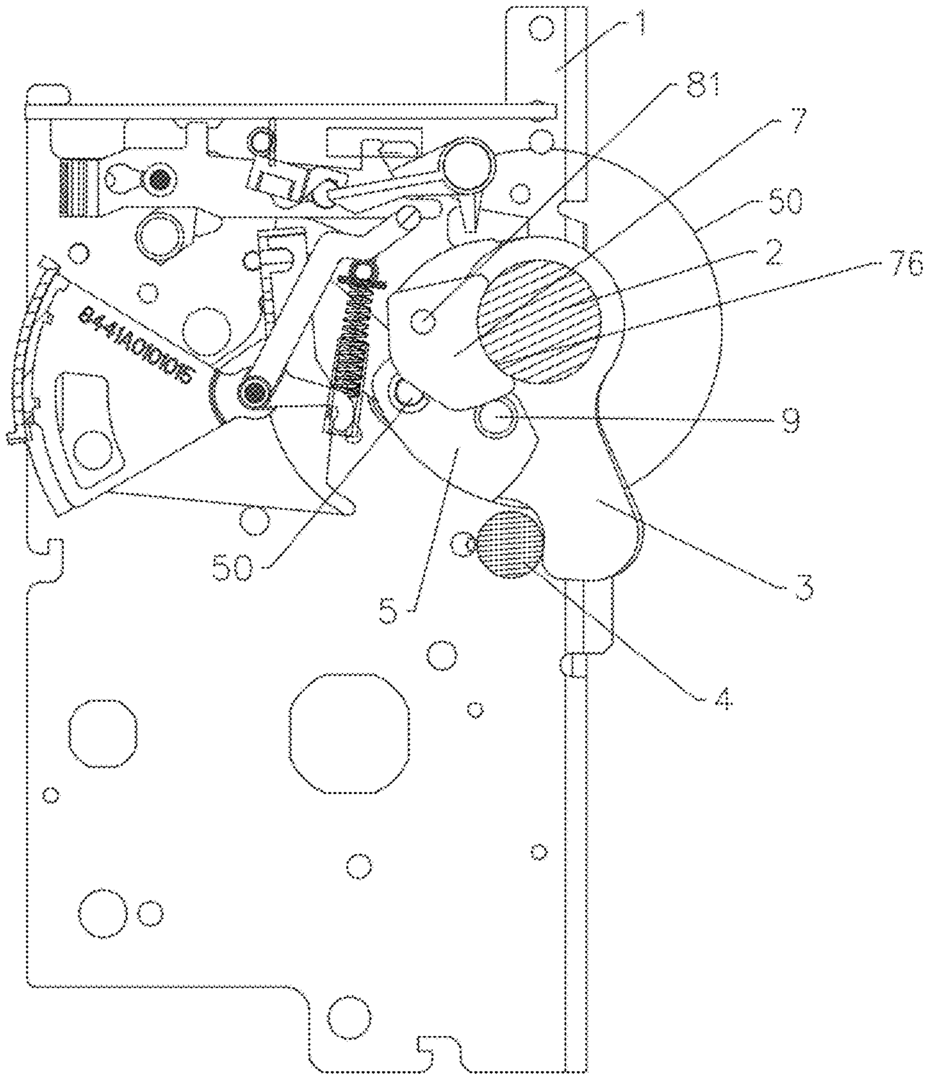
FIG. 7 is a schematic structural diagram of an operating mechanism in Embodiment 2.
Figure 8:
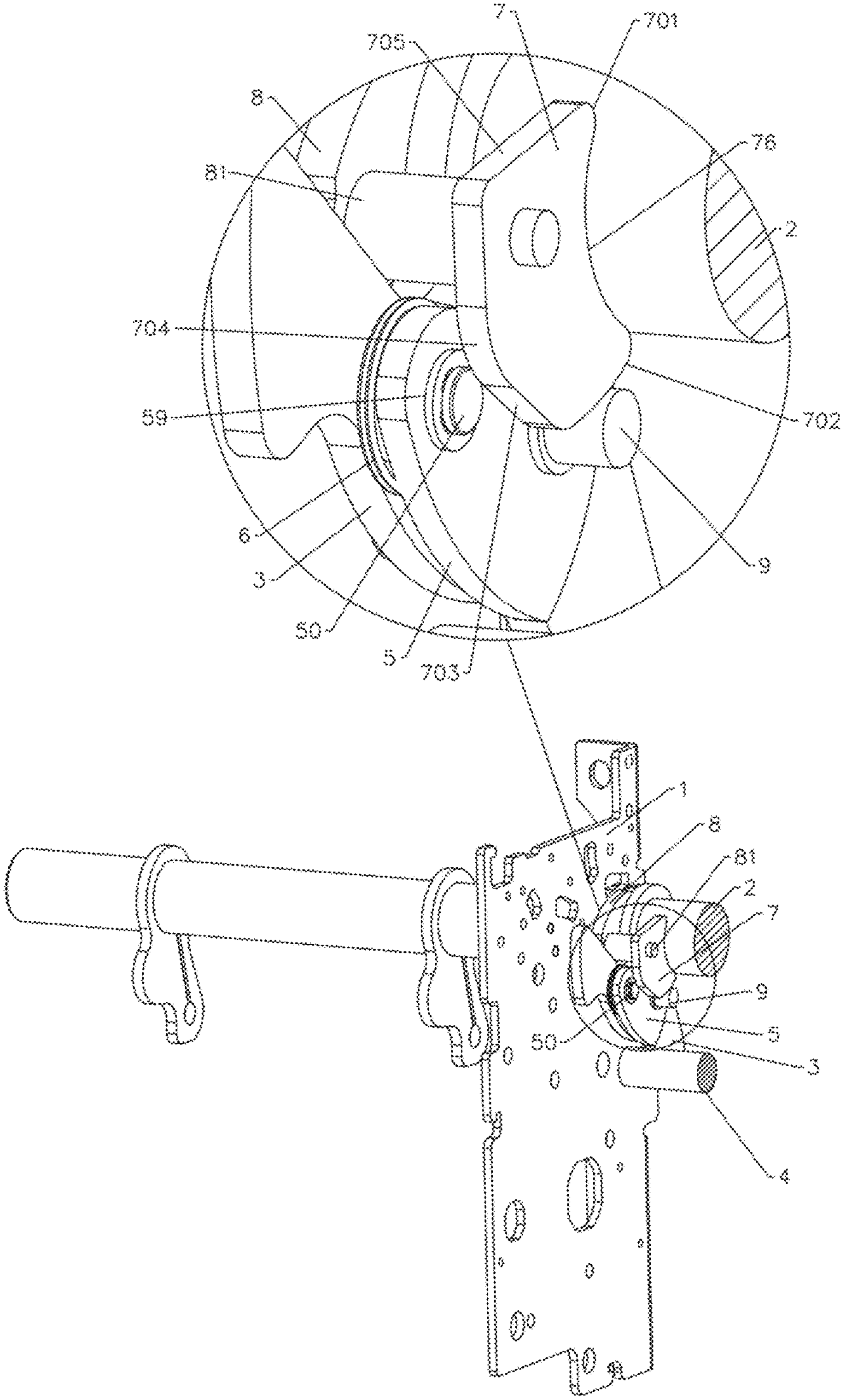
FIG. 8 is a schematic structural diagram and a partially enlarged view of the operating mechanism in Embodiment 2 from another perspective.

As shown in FIGS. 7-8, an operating mechanism of the present embodiment includes a main shaft 2, a limiting shaft 4, a swinging member 3 and a limiting structure. The main shaft 2 is used for driving the swinging member 3 to rotate. The swinging member 3 is provided with a rotatable anti-rebound structure, and an elastic member 6 used for driving the anti-rebound structure to be in contact limiting with the limiting structure. The anti-rebound structure can be separated from the limiting structure and collides with the limiting shaft 4 before the main shaft 2 rebounds, thereby preventing the main shaft 2 from rebounding and rotating. The limiting structure and the anti-rebound structure include an impacting member 7 and a blocking member 5, respectively. The elastic member 6 is used for driving the blocking member 5 to rotate. The impacting member 7 and the blocking member 5 are respectively arranged in two different planes. A side surface of at least one of the impacting member 7 and the blocking member 5 is provided with a protruding impacting shaft 9, and the impacting shaft 9 extends into the plane where the other one is located for contact limiting.

According to the operating mechanism of the present embodiment, the impacting member 7 of the limiting structure and the blocking member 5 of the anti-rebound structure are respectively arranged in different two planes, thereby ensuring that the impacting member 7 and the blocking member 5 are not arranged in the same plane. The impacting member 7 does not need to extend between the blocking member 5 and the main shaft 2 and is then contact limiting with the limiting member 5, so the space on the side surface of the blocking member 5 is effectively utilized, and the volume of the impacting member 7 is increased, thereby reducing the difficulty of assembly. In addition, the impacting member 7 can choose a more reasonable shape and a larger volume, can increase the area of contact between the impacting member 7 and the blocking member 5, or improve the strength of the impacting member 7, so that the impacting member 7 is designed to cooperate with the blocking member 5 more reliably.

As shown in FIG. 7, the present embodiment further provides a circuit breaker. The circuit breaker includes an operating mechanism of the present embodiment. The operating mechanism includes a side plate 1, and a main shaft 2 rotatably mounted on the side plate 1. The main shaft 2 is used for driving a moving contact of the circuit breaker to make actions (not shown), such that the moving contact is in contact with and separated from a static contact, thereby realizing closing and opening operations of the circuit breaker. At least one swinging member 3 is fixed on the main shaft 2. The swinging member 3 may be fastened on the main shaft 2 by means of welding and swing along with the main shaft 2. The swinging member 3 is used for being connected to the moving contact, or for being connected to a link mechanism (not shown), or for being connected to other mechanisms that are driven by the main shaft 2.

In the process of the circuit breaker from a closing state to an opening state, the main shaft 2 of the operating mechanism of the circuit breaker may produce a rebound phenomenon. A rotatable anti-rebound structure and an elastic member 6 used for driving the anti-rebound structure to be in contact limiting with the limiting structure are arranged on the swinging member 3. The anti-rebound structure includes a blocking member 5. The limiting structure includes an impacting member 7 which is fixedly arranged. The blocking member 5 is rotatably arranged on the swinging member 3. The elastic member 6 acts on the blocking member 5. The impacting member 7 and the blocking member 5 are arranged in two different planes. A side surface of the impacting member 7 and/or the blocking member 5 is provided with an impacting shaft 9. The elastic member 6 drives the blocking member 5 to rotate, so that the impacting member 7 is in limiting fit with the blocking member 5 through the impacting shaft 9. When the anti-rebound structure is in contact limiting with the limiting structure, the limiting shaft 4 is located outside a rotation trajectory 50 of the blocking member 5, thereby avoiding the limiting shaft 4 and the anti-rebound structure from impacting in the closing and opening processes shown in FIGS. 10-11. Only at an instant of opening in place, the anti-rebound structure overcomes an elastic force of the elastic member 6 and is separated from the limiting structure under the driving of inertia. Meanwhile, a radius of the rotation trajectory 50 of the blocking member 5 increases, so that the limiting shaft 4 is located on the rotation trajectory 50 of the blocking member 5, thereby preventing the rebound rotation of the main shaft 2 as the blocking member 5 impacts the limiting shaft 4. Finally, the elastic member 6 drives the anti-rebound structure to be in contact limiting with the limiting structure again, such that the anti-rebound structure cannot collide with the limiting shaft 4, thereby ensuring normal opening and closing operations.

Figure 9:
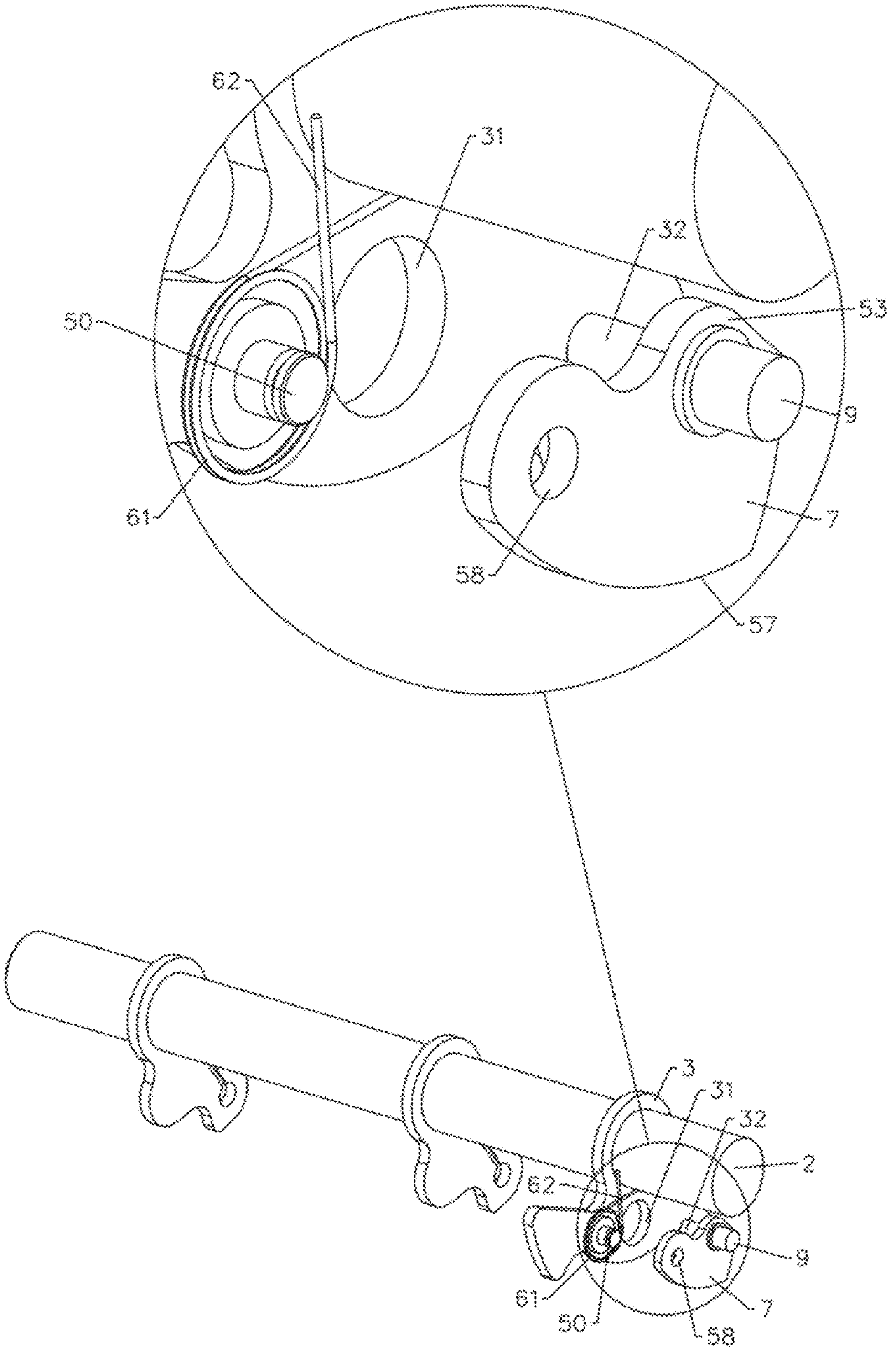
FIG. 9 is an exploded view and a partially enlarged view of the operating mechanism in Embodiment 2.

As shown in FIGS. 8-9, the impacting shaft 9 in the present embodiment is arranged on a side surface of the blocking member 5, the impacting shaft 9 and the blocking member 5 are formed integrally, the impacting shaft 9) extends into the plane where the impacting member 7 is located, and the impacting member 7 is in contact limiting with the impacting shaft 9. The elastic member 6 can drive the blocking member 5 to rotate counterclockwise, so that the impacting shaft 9 is in limiting fit with the right side edge of the impacting member 7.

As other embodiments, the impacting shaft 9 may also be arranged on a side surface of the impacting member 7, the impacting shaft 9 extends into the plane where the blocking member 5 is located, and the blocking member 5 is in contact limiting with the impacting shaft 9, all of which fall within the protection scope of the present invention.

It may be understood that the impacting shaft 9 may also be respectively arranged on the side surface of the blocking member 5 and the side surface of the impacting member 7, and the impacting shaft 9) on the blocking member 5 is in contact and limiting fit with the impacting shaft 9 on the impacting member 7, both of which fall within the protection scope of the present invention.

As shown in FIG. 8, the impacting member 7 is provided with a positioning groove. A sliding surface 76 of an arc shape is arranged in the positioning groove. The positioning groove is used for being sleeved on the main shaft 2, such that the sliding surface 76 is in contact limiting with the side surface of the main shaft 2. The main shaft 2 is in limiting fit with the impacting member 7 so as to play a role of positioning and supporting the impacting member 7, thereby preventing the position of the impacting member 7 from changing in the follow-up work.

Further, a bearing bush 8 is arranged between the swinging member 3 and the side plate 1. The impacting member 7 is fixedly connected to the bearing bush 8 through a connecting member 81. The length of the connecting member 81 is greater than a sum of the thickness of the swinging member 3 and the thickness of the blocking member 5. The swinging member 3 and the blocking member 5 can be inserted between the impacting member 7 and the bush bearing 8, respectively, and the connecting member 81 plays an avoidance role.

Further, the impacting member 7 is pentagonal. The impacting member 7 includes a first side edge 701, a second side edge 702, a third side edge 703, a fourth side edge 704 and a fifth side edge 705 that are connected in sequence. The first side edge 701 is provided with the positioning groove. The second side edge 702 is in contact fit with the impacting shaft 9. The third side edge 703 is arranged at an oblique angle to the second side edge 702 and the fourth side edge 704, respectively. The junction between the fourth side edge 704 and the fifth side edge 705 is provided with a fixing hole on one side close to the middle part of the impacting member 7, and the fixing hole is designed to cooperate with the connecting member 81. Preferably, the junctions among the first side edge 701, the second side edge 702, the third side edge 703, the fourth side edge 704 and the fifth side edge 705 are chamfered, respectively.

Further, as shown in FIG. 9, the impacting shaft 9 is arranged on a side surface of the blocking member 5 away from the swinging member 3. The side surface of the blocking member 5 close to the swinging member 3 is provided with a swinging shaft 32 designed to cooperate with the elastic member 6. The elastic member 6 pushes the swinging shaft 32 to drive the blocking member 5 to rotate, and the swinging member 3 is provided with a swinging hole 31 for avoiding the swinging shaft 32.

Preferably, the swinging shaft 32 is coaxially arranged with the impacting shaft 9. The swinging shaft 32 and the impacting shaft 9) are coaxially arranged, so that the difficulty of processing can be reduced, and the balance of a limiting plate is improved.

Further, the swinging member 3 is provided with a blocking shaft 50. The blocking member 5 is provided with a mounting hole 58 for being sleeved on the blocking shaft 50. The blocking shaft 50 is provided with a retaining ring 59 for limiting the blocking member 5. The elastic member 6 includes a spiral portion 61 arranged between the blocking member 5 and the swinging member 3, and two elastic rods 62 respectively connected to the spiral portion 61. The spiral portion 61 is rotatably mounted on the blocking shaft 50. The two elastic rods 62 are designed to cooperate with the main shaft 2 and the swinging shaft 32 on the blocking member 5, respectively. Of course, the blocking member 5 may also be provided with holes, or a hook may be arranged on the side edge instead of the swinging shaft 32, both of which fall within the protection scope of the present invention.

As shown in FIG. 9, two opposite side edges of the blocking member 5 are respectively provided with an avoidance surface 57 and an impacting portion 53, respectively. Two opposite side edges of the impacting portion 53 are respectively provided with a swinging shaft 32 and an impacting shaft 9, respectively. The impacting shaft 9 is in limiting fit with the impacting member 7. The avoidance surface 57 is used for avoiding the limiting shaft 4 when the anti-rebound structure is in contact limiting with the limiting structure.

Figure 10:
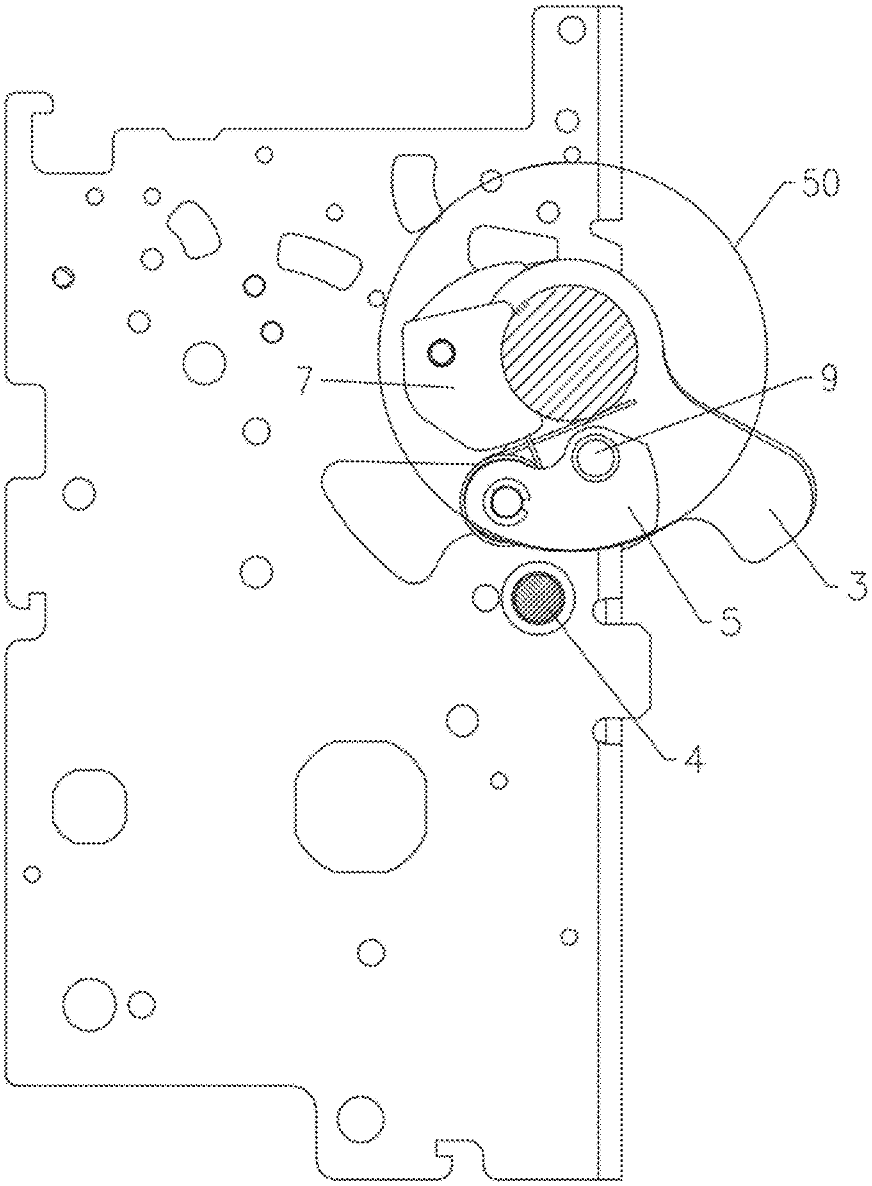
FIG. 10 shows positions of parts of the operating mechanism in Embodiment 2 at the beginning of opening.
Figure 11:
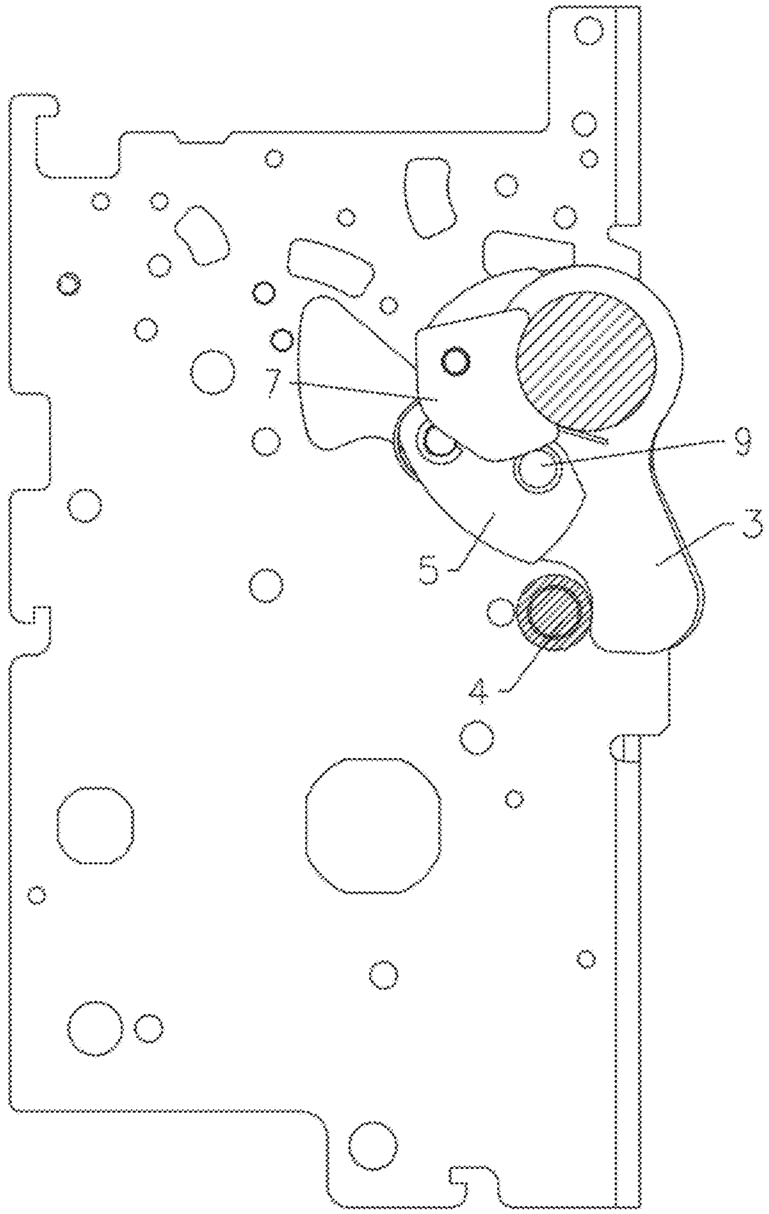
FIG. 11 shows positions of parts of the operating mechanism in Embodiment 2 in the case of opening in place.
Figure 12:
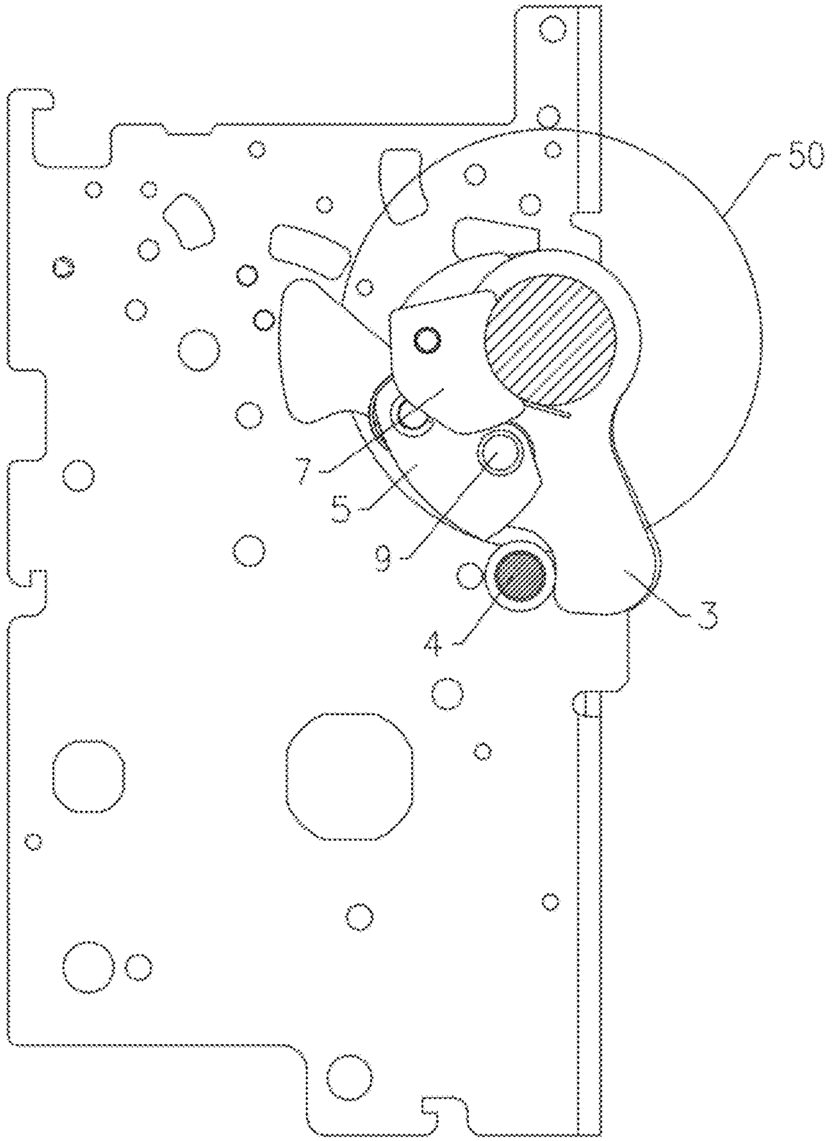
FIG. 12 shows positions of parts of the operating mechanism in Embodiment 2 at the moment of rebound.

In the closing to opening process shown in FIGS. 10-11, when the elastic member 6 drives the blocking member 5 to be in contact limiting with the impacting shaft 9, the blocking member 5 as a whole rotates clockwise with the main shaft 2 and the swinging member 3 and does not contact the limiting shaft 4. The avoidance surface 57 is used for avoiding the limiting shaft 4, so that the limiting shaft 4 is located outside a rotation trajectory of the blocking member 5 around the main shaft 2, thereby avoiding the limiting shaft 4 from colliding with the blocking member 5. As shown in FIGS. 10 and 12, a right end of the blocking member 5 rotates from the right side of the limiting shaft 4 in FIG. 10 to the left side of the limiting shaft 4 in FIG. 12.

As shown in FIG. 12, at an instant of opening in place, because a cantilever 3 collides with the limiting shaft 4, the blocking member 5 rotates due to inertia, such that the right end of the blocking member 5 rotates downward away from the main shaft 2 and is separated from the impacting member 7, a distance from the right end of the blocking member 5 to the main shaft 2 increases, and a radius of the right end of the blocking member 5 along with the main shaft 2 increases, thereby increasing a trajectory radius that the right end of the blocking member 5 rotates along with the main shaft 2, until the limiting shaft 4 is located on the rotation trajectory 50 of the right end of the blocking member 5. The right end of the blocking member 5 collides with the limiting shaft 4 to prevent the main shaft 2 from rebounding and rotating. Finally, the elastic member 6 drives the blocking member 5 to rotate close to the main shaft 2, until the impacting shaft 9 on the blocking member 5 is in contact limiting with the impacting member 7, and returns to a position in FIG. 11 again. The limiting shaft 4 is arranged outside the rotation trajectory of the blocking member 5 around the main shaft 2, thereby avoiding the limiting shaft from colliding with the blocking member 5, thereby ensuring normal opening and closing operations.

It should be explained that, in the description of the present invention, the terms such as "up", "down", "left", "right", "inner" and "outer" indicating the directional or positional relations on the basis of the directional or positional relations shown in the drawings are only used for conveniently describing the present invention and simplifying the description, not indicate or imply that the referred devices or elements must have a specific orientation and be configured and operated in a specific direction; therefore, they cannot be construed as a limitation on the present invention.

We have made further detailed description of the present invention mentioned above in combination with specific preferred embodiments, but it is not deemed that the specific embodiments of the present invention is only limited to these descriptions. A person skilled in the art can also, without departing from the concept of the present invention, make several simple deductions or substitutions, which all be deemed to fall within the protection scope of the present invention.

The invention claimed is:

1. An operating mechanism, comprising:

a main shaft rotatably mounted on a side plate, and a swinging member arranged on the main shaft, the side plate being provided with a limiting shaft for blocking the rotation of the swinging member, wherein a rotatable blocking member and an elastic member connected to the blocking member are arranged on the swinging member;

the swinging member can drive the blocking member to rotate around the main shaft;

the elastic member is used for driving a blocking portion of the blocking member to rotate toward the main shaft, so that the limiting shaft is located outside a path of the blocking portion which rotates around the main shaft;

the operating mechanism is also provided with an impacting portion;

the impacting portion is provided with two limiting portions arranged at intervals;

the two limiting portions are respectively in limiting fit with the main shaft;

when the blocking member rotates along with the swinging member and contacts the impacting member, the impacting member is used for pushing the blocking portion to overcome an acting force of the elastic member to rotate away from the main shaft, so that the limiting shaft is located on the path of the blocking portion which rotates around the main shaft;

the main shaft is rotatably mounted on a bearing bush;

the bearing bush is connected to the side plate through a connecting member;

the impacting member is provided with a connecting hole designed to cooperate with the connecting member; and the impacting member, the bearing bush and the side plate are fixed through the connecting member.

2. The operating mechanism according to claim 1, wherein when the swinging member rotates to an opening position, the swinging member contacts the limiting shaft; and when the swinging member rotates from a closing position to the opening position, the blocking member contacts the impacting member.

3. The operating mechanism according to claim 2, wherein the blocking member comprises a pivoting portion that is rotatably connected to the swinging member, and a blocking portion connected to the pivoting portion; a blocking surface is arranged at one end of the blocking portion away from the pivoting portion; when the swinging member rotates to the closing position, the blocking surface and the impacting member are oppositely located on both sides of a line connecting the main shaft and the limiting shaft; when the swinging member rotates to the opening position, the blocking member is driven to rotate and contact the impacting member, and the blocking surface rotates to align on the same side as the impacting member with the line connecting the main shaft and the limiting shaft; and the blocking surface is designed to cooperate with the limiting shaft to block the swinging member from rotating back towards the closing position.

4. The operating mechanism according to claim 3, wherein the pivoting portion is spaced apart from the main shaft to form a first avoidance groove; the first avoidance groove is used for avoiding the impacting member; an impacting portion is arranged on one side of the blocking portion close to the main shaft; the impacting member first passes through the first avoidance groove and then pushes the impacting portion, so that the impacting portion drives the blocking portion to rotate away from the main shaft.

5. The operating mechanism according to claim 3, wherein the impacting member is provided with a second avoidance groove for avoiding the pivoting portion.

6. The operating mechanism according to claim 1, wherein a shaft sleeve is arranged between the impacting member and the bearing bush; the shaft sleeve is sleeved on the connecting member; and the shaft sleeve is used for limiting the impacting member, so that the impacting member and the blocking member are located on the same plane.

7. The operating mechanism according to claim 1, wherein a sliding surface of an arc shape is arranged between the two limiting portions, and the sliding surface is in sliding fit with the main shaft.

8. The operating mechanism according to claim 1, wherein the impacting member and the blocking member are respectively arranged in two different planes, a side surface of at least one of the impacting member and the blocking member is provided with a protruding impacting shaft, and the impacting shaft extends into the plane where the other one is located for contact limiting.

9. The operating mechanism according to claim 8, wherein the impacting shaft is arranged on a side surface of the blocking member, the impacting shaft extends into the plane where the impacting member is located, and the impacting member is in contact limiting with the impacting shaft; or, the impacting shaft is arranged on a side surface of the impacting member, the impacting shaft extends into the plane where the blocking member is located, and the blocking member is in contact limiting with the impacting shaft.

10. The operating mechanism according to claim 8, wherein the impacting member is fixedly connected to the bearing bush through the connecting member; the length of the connecting member is greater than a sum of the thickness of the swinging member and the thickness of the blocking member; and the swinging member and the blocking member can be inserted between the impacting member and the bearing bush, respectively.

11. The operating mechanism according to claim 8, wherein the impacting member is pentagonal; the impacting member includes a first side edge, a second side edge, a third side edge, a fourth side edge and a fifth side edge that are connected in sequence; the first side edge is provided with a positioning groove; the second side edge is in contact fit with the impacting shaft; the third side edge is respectively arranged at an oblique angle to the second side edge and the fourth side edge; and one side of the junction between the fourth side edge and the fifth side edge close to the middle part of the impacting member is connected to the connecting member.

12. The operating mechanism according to claim 8, wherein the impacting shaft is arranged on a side surface of the blocking member away from the swinging member; the side surface of the blocking member close to the swinging member is provided with a swinging shaft designed to cooperate with the elastic member; the elastic member pushes the swinging shaft to drive the blocking member to rotate; the swinging member is provided with an avoidance hole for avoiding the swinging shaft; and the swinging shaft is coaxially arranged with the impacting shaft.

13. The operating mechanism according to claim 12, wherein the swinging member is provided with a blocking shaft; the blocking member is provided with a mounting hole for being sleeved on the blocking shaft; the elastic member comprises a spiral portion arranged between the blocking member and the swinging member, and two elastic rods respectively connected to the spiral portion; the spiral portion is rotatably mounted on the blocking shaft; and the two elastic rods are designed to cooperate with the main shaft and the swinging shaft, respectively.

14. The operating mechanism according to claim 12, wherein two opposite side edges of the blocking member are respectively provided with an avoidance surface and an impacting portion, respectively; two opposite side edges of the impacting portion are respectively provided with a swinging shaft and an impacting shaft, respectively; and the avoidance surface is used for avoiding the limiting shaft when the anti-rebound structure is in contact limiting with the limiting structure.

* * * * *